Patented Sept. 17, 1946

2,407,966

UNITED STATES PATENT OFFICE 2,407,966

DIAZINE COMPOUNDS

James M. Sprague, Drexel Hill, Pa., assignor to Sharp & Dohme, Incorporated, Philadelphia, Pa., a corporation of Maryland No Drawing. Application October 14, 1940, Serial No. 361,106

6 Claims. (Cl. 260—239.6)

This invention relates to new heterocyclic derivatives of sulfanilamide in which a heterocyclic radical is linked to the sulfonamido group, and more particularly to such derivatives in which the heterocyclic grouping is derived from pyrimidine heterocyclic groupings.

The new products of this invention are therapeutically useful particularly in combatting bacterial infections such as coccus infections, such as streptococcus and especially pneumococcus, and other infections.

The products of the invention may be represented by the general formula $M \cdot Ar \cdot SO_2NRY$, in which M may be hydrogen, a nitro, amino, or alkyl-, acyl- or acylalkyl-amino group, and Ar represents an aryl radical such as phenyl, tolyl, xylyl and the like, and R may be hydrogen or an alkyl or aralkyl radical, saturated or unsaturated, for example, methyl, ethyl, propyl, butyl, amyl, allyl, hexyl, heptyl, octyl and the like, or decyl, dodecyl, hexadecyl, and the like, or benzyl and the like and Y is a heterocyclic radical attached to the sulfonamido nitrogen and selected from the group consisting of the pyrimidyl and nuclear substituted pyrimidyl groups.

The nuclear substituent on the pyrimidyl group may be of the hydrocarbon radical type such as the saturated or unsaturated alkyl radicals, straight or branched chain or cyclic, monovalent mono- or di-substituent, for example, methyl, di-methyl, ethyl, di-ethyl, propyl, butyl, isobutyl, amyl, allyl, methallyl, cyclo-pentyl and -hexyl, cyclo-pentenyl and the like, or an aryl radical such as phenyl, tolyl, naphthyl, or aralkyl radical as benzyl and the like, or polyvalent as polyalkylene such as polymethylene, e. g. tetramethylene and the like, or may be a radical containing oxygen or sulfur as the hydroxyl group or an alkoxy group such as methoxy, ethoxy, propoxy and the like, or the corresponding sulfur analog radical such as an alkylthio radical as methylthio or ethylthio group and the like, or the carbalkoxy radical as carbmethoxy, carbethoxy and the like, or may also be a halogen radical, for example, chlorine or bromine. One or more nuclear substituents may occur on the same pyrimidyl nucleus and, in the latter case, they may be identical or different examples of the same type or of entirely different types as noted from the examples hereinbelow.

In the various cases in which R may be either hydrogen or an alkyl or aralkyl radical, M may be either hydrogen, a nitro, an amino, alkylamino, acylalkylamino or an acylamino radical, such as the butyryl-, valeryl-, caproyl-, heptoyl-, and octoylamino radicals and the like, and Y may be either a non-substituted or substituted pyrimidyl group.

The products of this invention in which M of the general structural formula is a nitro or acylamino group while R is hydrogen are generally prepared by condensing an amino derivative of pyrimidine or of the nuclear substituted pyrimidine (having the particular structure which it is desired to introduce into the end product) with, for example, either a nitro- or acylamino-phenylsulfonyl halide, e. g., o- or p-nitrobenzenesulfonyl chloride or p-acetylaminobenzenesulfonyl chloride, and splitting off hydrogen halide, the reaction being carried out in a suitable solvent, such as pyridine, or acetone in the presence of an excess of the amino pyrimidyl compound.

The corresponding products in which M is an amino group are obtained either by reducing, preferably by catalytic reduction, the above described nitro compound having R as hydrogen, or by hydrolyzing the described corresponding acylamino compound in either the presence of acid or, in many cases, preferably in the presence of alkali.

To prepare the product in which R of the general structural formula is an alkyl or aralkyl group and M is a nitro or acylamino group, the nitro- or acylamino-phenylsulfonamido heterocyclic compound above described in which R of the general formula is hydrogen is alkylated by reaction with a suitable alkylating agent such as an alkyl or aralkyl halide, as methyl chloride or bromide or ethyl chloride or bromide or benzyl chloride, or an alkyl sulfate as diethyl sulfate, or an alkyl sulfonate, and the like, to replace the hydrogen represented by R by the desired alkyl or aralkyl radical. The desired end product in which R is alkyl or aralkyl and M is amino is obtained by reducing the corresponding nitrophenylsulfonylalkylamido (or -aralkylamido) heterocyclic compound or hydrolyzing the corresponding acylaminophenylsulfonyl-alkylamido (or -aralkylamido) heterocyclic derivative. The alkylation of the acylamino-phenylsulfonamido pyrimidyl compound is advantageously carried out by dissolving such starting material in dilute aqueous sodium hydroxide and alkylating by shaking with a slight excess of the selected alkylating agent such as dimethyl sulfate. The alkylation may be carried out similarly with the nitrophenylsulfonamido pyrimidyl starting material. Thus there is obtained the (p-acetylaminophenylsulfonylmethylamino)- or the corresponding (nitrophenylsulfonylmethylamino) - pyrimidyl product, the acetyl derivative yielding upon hydrolysis, and the nitro derivative yielding upon reduction, the corresponding (aminophenylsulfonylmethylamino)-pyrimidyl derivative. If the dimethyl sulfate is replaced by diethyl sulfate, the corresponding acylamino- or nitro-phenylsulfonylethylamino pyrimidyl derivative is obtained, the acetylamino product yielding on subsequent hydrolysis, and the nitro derivative yielding upon subsequent reduction, the (aminophenylsulfonylethylamino)-pyrimidyl product.

The invention may be illustrated by, but not restricted to, the following examples, in which the numerical positions in the pyrimidyl nucleus,

are determined by designating the lower left hand corner nitrogen atom as in the 1-position and then going on clockwise to the lower right hand carbon atom as in the 6-position: Actually, when there is no substituent, or the same substituent, in both the 4- and the 6- positions, or when there is a substituent in one of these two and none in the other, then in the numbering of these two positions, the 4- and the 6-positions are equivalent.

*Example 1.*—*2-(sulfanilamido-)6-methyl pyrimidine.* To a well agitated solution of 6.95 g. of 2-amino-6-methyl pyrimidine in 40 cc. of pyridine, 15 g. of p-acetylaminobenzenesulfonyl chloride are added in small portions over a thirty minute period. The reaction mixture is then heated on a steam bath for thirty minutes, the free pyridine being then removed under reduced pressure and the residue mixed with cold water, and the latter mixture is vigorously stirred. The solid reaction product is removed by filtration and washed with cold water. There is obtained a yield of 14 g. of crude 2-(p-acetylaminobenzenesulfonamido)-6-methyl pyrimidine, which on recrystallization from alcohol and water melts at 238–239°. The crude product is hydrolyzed by suspending it in 400 cc. of 2 N. hydrochloric acid and warming until solution is complete. The solution is neutralized with sodium carbonate and the precipitated 2(sulfanilamido-)-6-methyl pyrimidine is removed by filtration. The latter on recrystallization from alcohol and water shows a melting point of 225–226°,

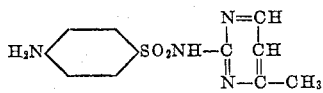

The above described acetylamino intermediate and the amino end product obtained therefrom by hydrolysis may each be separately further purified by solution in dilute aqueous ammonia and with stirring decolorizing carbon into the solution. After filtering off the carbon, the purified product is recovered as the precipitate formed upon neutralizing the filtrate. The precipitate is then recrystallized from alcohol and water and, as thus purified, the dried 2-(p-acetylaminobenzenesulfonamido)-6-methyl - pyrimidine [or 2 - (p-acetylaminobenzenesulfonamido) - 4 - methylpyrimidine] melts at 245–246° and the 2-(sulfanilamido)-6-methyl - pyrimidine (or 2 - sulfanilamido-4-methyl-pyrimidine) melts at 230–231°.

If the above pyrimidine starting material is replaced by 4-amino 6-methyl pyrimidine, the corresponding acetylaminobenzenesulfonamido pyrimidine derivative results, which on hydrolysis yields 4-(sulfanilamido)-6-methyl pyrimidine,

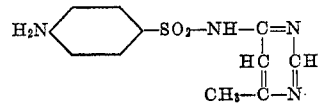

*Example 2.*—*2-(sulfanilamido)-4-ethoxy - 6-methyl-pyrimidine.* To a solution of 0.16 mol. of 2-amino-4-ethoxy-6-methyl - pyrimidine (readily prepared from 2-amino-4-chloro - 6 - methyl pyrimidine and sodium dissolved in alcohol) in pyridine, 0.16 mol. of p-acetylaminobenzenesulfonyl chloride is added in portions with stirring over a period of one and one-half hours. After the addition is complete, the reaction mixture is warmed on a steam bath for one hour and then chilled, and the crude 2(p-acetylamino-benzenesulfonamido)-4-ethoxy-6-methyl pyrimidine is removed by filtration and washed with cold water. The crude yield is 40 g., M. P. 238–40°. After recrystallization from alcohol and water, it melts at 244.5–245°. The crude product is dissolved in 10% sodium hydroxide and heated on a steam bath for one and one-quarter hours. The solution is chilled and neutralized with hydrochloric acid. Aqueous ammonia solution is added to redissolve the precipitated product and the resulting solution treated with decolorizing carbon. After filtering off the carbon and neutralizing the solution with acetic acid, the 2-(sulfanilamido)-4-ethoxy-6-methyl pyrimidine is obtained in a hydrated form in 72% yield. It melts at 104–5° with loss of water of hydration, resolidifies and melts again at 151–152°. The material after recrystallization from 20% alcohol had the same melting point.

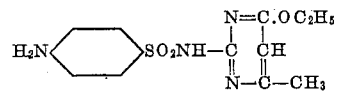

*Example 3.*—*2-(sulfanilamido)-4-hydroxy - 6-methyl pyrimidine.* Finely pulverized 2 - (p-acetylaminobenzene-sulfonamido)-4-ethoxy - 6-methyl pyrimidine (see Example 2) is suspended in 2-normal hydrochloric acid and heated near refluxing until the solid dissolves completely and heating is then continued for fifteen minutes. The acid solution is neutralized with aqueous ammonia; the crude product (M. P. 225–230°) removed and recrystallized from 40% alcohol, M. P. 253.5–254°.

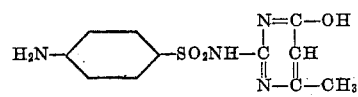

Using p-acetylaminobenzenesulfonyl chloride or any other selected acylaminobenzenesulfonyl chloride and condensing it with pyrimidine or any desired nuclear mono- or poly- substituent thereof in accordance with the procedure of Example 1 or 2, a wide variety of corresponding acylaminobenzenesulfonyl-pyrimidine derivatives are obtained, which on subsequent hydrolysis, preferably alkaline as in Example 2, yield a correspondingly wide variety of aminobenzenesulfonyl-pyrimidine derivatives as indicated by the following examples:

*Example 4.*—*2-(sulfanilamido)-pyrimidine*

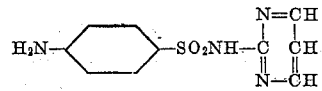

the melting point of which is 251–252°, and of the corresponding intermediate acetyl derivative is 253–254°.

*Example 5.—2-(sulfanilamido)-4, 6-dimethyl-pyrimidine*

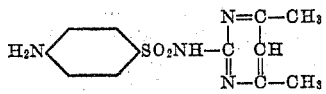

the melting point of which is 175.5–176°, and of the corresponding intermediate acetyl derivative is 240–241.5°.

*Example 6.—4-(sulfanilamido) - 2 - ethoxy-6-methyl-pyrimidine*

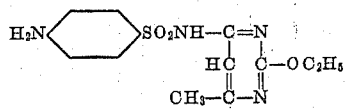

the melting point of which is 186–187°, and of the corresponding intermediate acetyl derivative is 200–201°.

In this example, if the 4-amino-2-ethoxy-6-methyl-pyrimidine is replaced by 4-amino-2-ethylthio-6-methyl-pyrimidine, the corresponding pyrimidine derivative of sulfanilamide is obtained in which the ethoxy group in the structural formula of this example is replaced by the ethylthio group, —$SC_2H_5$.

*Example 7.—2-(sulfanilamido)- 6- n - propyl-pyrimidine*

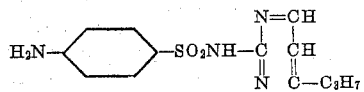

the melting point of which is 217–218°, and of the corresponding intermediate acetyl derivative is 253.5–254°.

*Example 8.—2-(sulfanilamido)-5-n-butyl - pyrimidine*

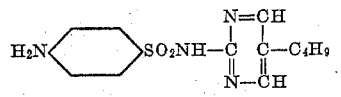

the melting point of which is 204–205°, and of the corresponding intermediate acetyl derivative is 241–242°.

*Example 9.—2-(sulfanilamido)-6-n-hexyl - pyrimidine*

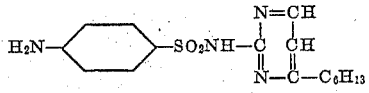

the melting point of which is 208–9°, and of the corresponding intermediate acetyl derivative is 214–215°.

*Example 10.—2-(sulfanilamido)-5-methyl-pyrimidine*

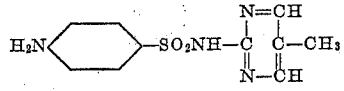

the melting point of which is 262–263°, and of the corresponding intermediate acetyl derivative is 271–272°.

*Example 11.—2-(sulfanilamido)-6-phenyl-pyrimidine*

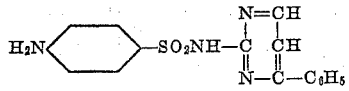

the melting point of which is 268–269°, and of the corresponding intermediate acetyl derivative is 274–275°.

If, in Example 5, 2-amino-4,6-dimethyl-pyrimidine is replaced by a 2-amino-4-phenyl, 6-methyl-pyrimidine, the corresponding acetyl intermediate and substituted pyrimidine derivative of sulfanilamide, having the phenyl group in the 4-position and the methyl group in the 6-position of the pyrimidine nucleus are obtained.

If, in this example, the 2-amino-6-phenyl pyrimidine is replaced by 2-amino-6 - carbethoxy - pyrimidine, the corresponding acetyl intermediate and substituted pyrimidine derivative of sulfanilamide, having the carbethoxy group in the 6-position (instead of the phenyl group) are obtained.

*Example 12.—2 - (sulfanilamido) - tetrahydrobenzopyrimidine*

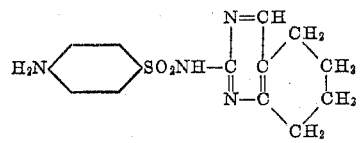

the melting point of which is 252–253°, and of the corresponding intermediate acetyl derivative is 255–256°. The preparations of this example illustrate the type in which there is attached a polyvalent substituent to the pyrimidine nucleus, the specific polyvalent substituent being the divalent tetramethylene group attached to the carbon atoms in the 5 and 6 positions of the pyrimidine nucleus. The end product of this example may also be designated as 2-(sulfanilamido) tetrahydroquinazoline.

*Example 13.—2-(sulfanilamido)-6-methyl - 5 - bromo-pyrimidine*

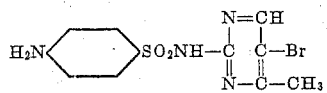

the melting point of which is 231–232°, and of the corresponding intermediate acetyl derivative is 261–262°.

By replacing the 2-amino-6-methyl-5-bromo-pyrimidine in this example by another amino-halo-pyrimidine, other acetylaminobenzenesulfonamido-halo-pyrimidines are obtained. Thus, by condensing acetylaminobenzenesulfonyl chloride with 2-amino-4-chloro-pyrimidine, there is obtained 2-(p-acetylaminobenzenesulfonamido)-4-chloro-pyrimidine which upon hydrolysis yields 2-(sulfanilamido)-4-chloro-pyrimidine. If the amino-chloro-pyrimidine is replaced by 2-amino-hydroxy-pyrimidine, the condensation with the sulfonyl chloride, as before, will yield the corresponding acetyl amino derivative and upon hydrolysis the corresponding sulfanilamido derivative having the hydroxyl group in the 4-position on the pyrimidine nucleus.

If, in any of the preceding examples, the p-acetylaminobenzenesulfonyl chloride is replaced by any other corresponding acylaminobenzenesulfonyl chloride, such as the o- or p-propionyl-, butyryl-, valeryl-, caproyl-, heptoyl-, or octoyl-aminobenzenesulfonyl chloride and a condensation carried out with 2-, 4-, or 5-amino-pyrimidine alone or as nuclearly substituted, as in any of the above examples or otherwise, the corresponding acylaminobenzenesulfanilamido - pyrimidine or (-substituted pyrimidine) is obtained and upon acid, or preferably alkaline, hydrolysis thereof there results the corresponding sulfanilamido-pyrimidine or -substituted pyrimidine. A simple example is 5-(o-valerylaminobenzenesulfonamido)-pyrimidine and 5-sulfanilamido)-pyrimidine.

Example 14.—2 - (p-caproylaminobenzenesulfanilamido) -6-methyl-pyrimidine

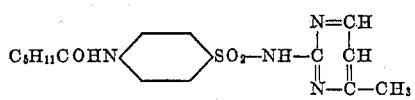

the melting point of which is ——, and which upon hydrolysis yields 2 - (sulfanilamido) - 6-methyl-pyrimidine which melts at ——.

Other compounds result when in place of the acylaminobenzenesulfonyl chloride starting material, there is employed either o- or p-nitrobenzenesulfonyl chloride. In the procedures illustrated by any of the above examples, as shown by:

Example 15.—2-(p-nitrobenzenesulfonamido)-6-methyl-pyrimidine

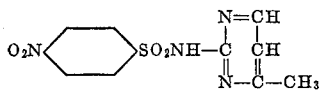

the melting point of which is 260–261°.

Products of the invention in which R of the general formula is an alkyl or aralkyl radical are obtained when a nitrobenzenesulfonamido pyrimidine, such as the product of Example 15, or when an acylaminobenzenesulfonamido pyridine of the type obtained in any of the other examples, is alkylated or aralkylated in the manner described in the eighth paragraph of this specification (columns 2–3).

The general description of the invention and the examples show that the products of the invention are not limited to those above specifically illustrated and identified. It is seen that the desired products covered by the invention according to the illustrated general formula structurally may be considered as consisting of three essential portions, one being broadly the acylamino-, nitro- or amino-aryl- or benzenesulfonyl portion, another being the pyrimidyl or nuclear substituted pyrimdyl portion, with these two being linked to the nitrogen atom of the middle (or third) portion which is an imino or substituted imino radical. The combination of these three essential portions gives the basic structure of any compound of the type contemplated, and it is readily seen that variations in substituents replacing any of the hydrogen atoms on any one or more than one of these three basic portions will yield different individual compounds embraced within the scope of the invention.

Thus it is seen that if Y in the general structural formula is simply the pyrimidyl radical and R is hydrogen, one compound results when M is an amino group in the para position to the sulfonyl radical; another is obtained when M is a nitro group in the same para position and still another when M is a nitro group in the ortho position; still another when M is the caproylamino group. Still further additional individual compounds are obtained if the caproyl radical in the compound just last referred to is replaced by another suitable acyl radical in which case the term "acyl" is intended to designate broadly the monovalent radical resulting when the hydroxyl group of the carboxylic radical is removed from the molecule of a carboxylic acid.

Thus the just above referred to acyl radical may be saturated or unsaturated alkyl, aryl, aralkly, alicyclic or heterocyclic, or substituted or unsubstituted, as illustrated by butyric, isobutyric, valeric, isovaleric, active valeric, caproic, alpha chlorcaproic, heptoic, caprylic, capric, lauric, palmitic, oleic, stearic, ricinoleic, myristic, behinic, benzoic, phenylacetic, phenylchloracetic, phenylaminoacetic, aminobenzoic, phenylpropionic, nitrobenzoic, pyromucic, cinnamic, chlorbenzoic, sulfobenzoic, mandelic, toluic, hydratropic, toluacetic, tropic, furalacrylic, hexahydrobenzoic, cyclopentanecarboxylic, nicotinic, and thiazole-4-carboxylic acids.

Other individual compounds are obtained when the aryl- or benzene-sulfonyl portion has a selected specific substituent of the type disclosed and the middle imino portion remains unsubstituted, but variations are made in the substituents linked to the pyrimidyl nucleus by selecting any of the nuclear substituents of the type hereinabove set forth. Still other individual compounds are possible by selecting a fixed benzene-sulfonyl portion with a specific substituent for M of the general formula and selecting the pyrimidyl or a specific nuclear substituted pyrimidyl radical possible according to the disclosure and above description and replacing the hydrogen of the middle imino portion by any one of the saturated or unsaturated alkyl radicals.

Thus while variations in the general make-up of the products of the invention as just above indicated give the several products specifically identified hereinabove and also products such as 2-(o-nitrobenzenesulfonylpropylamino) -6-methyl-pyrimidine, 2 - (ethylaminobenzenesulfonylbenzylamino) - 6 - ethoxy-pyrimidine and 2-(benzenesulfonamido)-pyrimidine, a very large number of other specific individual compounds is possible by making variations of the type hereinabove disclosed in either the aryl- or benzene-sulfonyl portion, the middle imino portion, or the end pyrimidyl portion, or in any one or two or all of the portions by substituents of the type set forth, all of which different specific individual compounds are included as a portion of this disclosure without listing separately their individual names all of which are readily apparent as each individual structure with the selected substituent or substituents is drawn.

The position of element M of the general structural formula is not restricted to para, for the substituent represented by M may also be in the ortho position. Thus, the nitro group, when in the ortho position in any compound embraced by the invention may, as pointed out above, also be reduced to yield the corresponding compound of the invention, in which M is an amino group in the ortho position. Such amino group in the ortho position of any compound embraced by the invention can be readily converted to any of the desired acylamino or acylalkylamino or alkylamino radicals to yield a compound embraced by the invention and in which M is an acylamino or acylalkylamino or alkylamino radical in the ortho position.

In the specification and the claims, the term "pyrimidyl" has been used generically in many instances as may be readily noted from the surrounding language particularly when it is preceded by the article "a," to embrace the radical of the individual compound, pyrimidine, as well as the radical of any homologues, isomers and nuclear substituents of the individual compound and of its homologues and isomers. In some instances in the specification and the claims the term "pyrimidines" has been used generically to embrace the same scope as just indicated with respect to the expression "pyrimidyl."

Also, in the specification and in the claims, in many instances the term "amino" has been used generically, as in aminobenzenesulfonamide, as may be readily noted from the surrounding language and by the use of the expression "an amino group" to embrace not only the unsubstituted amino radical, but also substituted amino radicals such as acylamino, acylalkylamino, arylamino and alkylamino radicals.

The compounds described in this application are also described in application Serial No. 472,156 filed January 12, 1943 for Azine compounds.

This application is a continuation-in-part of co-pending application Serial No. 287,936 filed August 2, 1939.

I claim:

1. A p-substituted benzene sulfonamido pyrimidine compound having the following formula:

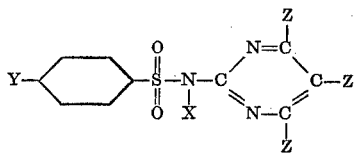

in which X is a positive radical and Y is a radical of the group consisting of $NH_2$ and radicals hydrolyzable to $NH_2$, the Z radicals being taken from the group consisting of lower alkyl hydrocarbon radicals and H, at least one Z radical being a lower alkyl hydrocarbon radical, prepared as a therapeutic agent and being effective against pneumococcal and streptococcal infections.

2. A p-substituted benzene sulfonamido pyrimidine compound having the following formula:

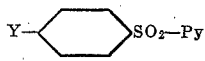

in which Y is a radical of the group consisting of $NH_2$, and radicals hydrolyzable to $NH_2$, and Py is a 2 amino pyrimidine radical, having no unduly toxic substituents, and linked to the $SO_2$ through the 2 amino group, said compound being prepared as a therapeutic agent and being effective against pneumococcal and streptococcal infections.

3. A p-aminobenzenesulfonamido-pyrimidine compound having the following formula:

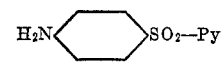

in which Py is a 2-amino-pyrimidine radical having no unduly toxic substituents, and linked to the $SO_2$ through the 2 amino group, said compound being prepared as a therapeutic agent and being effective against pneumococcal and streptococcal infections.

4. The compound 2-sulfanilamido-6-methyl-pyrimidine prepared as a therapeutic agent and being effective against pneumococcal and streptococcal infections.

5. A p-aminobenzenesulfonamido-pyrimidine compound having the following formula:

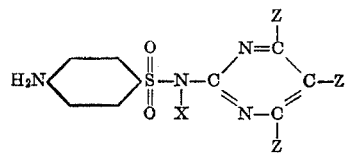

in which X is a positive radical, and the Z radicals are taken from the group consisting of lower alkyl hydrocarbon radicals and hydrogen, at least one Z radical being a lower alkyl hydrocarbon radical, prepared as a therapeutic agent and being effective against pneumococcal and streptococcal infections.

6. A p-aminobenzenesulfonamido-pyrimidine compound having the following formula:

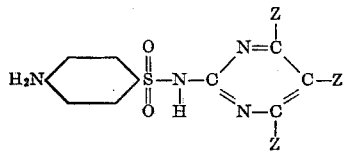

in which the Z radicals are taken from the group consisting of the lower alkyl hydrocarbon radicals and hydrogen, at least one Z radical being a lower alkyl hydrocarbon radical, prepared as a therapeutic agent and being effective against pneumococcal and streptococcal infections.

JAMES M. SPRAGUE.